US007636781B2

(12) United States Patent
Li et al.

(10) Patent No.: US 7,636,781 B2
(45) Date of Patent: Dec. 22, 2009

(54) SYSTEM AND METHOD FOR REALIZING THE RESOURCE DISTRIBUTION IN THE COMMUNICATION NETWORK

(75) Inventors: Bin Li, Shenzhen (CN); Xuegui Cao, Shenzhen (CN); Shaowen Ma, Shenzhen (CN); Zhong Chen, Shenzhen (CN); Baojiang Chen, Shenzhen (CN)

(73) Assignee: Hua Wei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 10/542,593

(22) PCT Filed: Sep. 17, 2003

(86) PCT No.: PCT/CN03/00785

§ 371 (c)(1),
(2), (4) Date: Jul. 18, 2005

(87) PCT Pub. No.: WO2004/064325

PCT Pub. Date: Jul. 29, 2004

(65) Prior Publication Data

US 2006/0182119 A1    Aug. 17, 2006

(30) Foreign Application Priority Data

Jan. 16, 2003    (CN) .............................. 03 1 02837

(51) Int. Cl.
*G06F 15/167* (2006.01)
*G06G 15/16* (2006.01)
*G06F 11/00* (2006.01)
(52) U.S. Cl. .................. 709/226; 709/219; 370/229
(58) Field of Classification Search ................. 709/219, 709/226; 370/229
See application file for complete search history.

(56) References Cited

U.S. PATENT DOCUMENTS 5,513,379 A    4/1996    Benveniste et al.
6,021,263 A *  2/2000    Kujoory et al. ............. 709/232

(Continued)

FOREIGN PATENT DOCUMENTS

EP    0 790 751 A2    8/1997

(Continued)

OTHER PUBLICATIONS

Stefano Salsano (ED) et al: "Inter-domain QoS Signaling: the BGRP Plus Architecture" IETF Standard-Working-Draft, Internet Engineering Task Force, IETF, CH, May 2002, XP015005141 pp. 1-17.

(Continued)

*Primary Examiner*—Jeffrey Pwu
*Assistant Examiner*—Guang Li
(74) *Attorney, Agent, or Firm*—Slater & Matsil, L.L.P.

(57) ABSTRACT

The present invention relates to a system for implementing resource allocation in network communication and a method thereof. It effectively solves the end-to-end QOS problem through dividing a communication network into a plurality of QOS domains and managing them. In the present invention, only end-to-end path information is maintained at the QER of the QOS domain that is directly connected with the source/destination terminal, while only edge-to-edge resource reservation information for aggregate flows is maintained at other QERs, thus significantly reducing flow state information maintained at the network nodes as well as overhead of signaling protocol processing and storage at the network nodes.

19 Claims, 4 Drawing Sheets

U.S. PATENT DOCUMENTS

| | | | |
|---|---|---|---|
| 6,434,624 B1 * | 8/2002 | Gai et al. | 709/232 |
| 6,487,595 B1 * | 11/2002 | Turunen et al. | 709/226 |
| 6,611,867 B1 * | 8/2003 | Bowman-Amuah | 709/224 |
| 6,631,122 B1 * | 10/2003 | Arunachalam et al. | 370/332 |
| 6,687,655 B2 * | 2/2004 | Oosthoek et al. | 702/186 |
| 6,708,209 B1 * | 3/2004 | Ebata et al. | 709/223 |
| 6,771,661 B1 * | 8/2004 | Chawla et al. | 370/468 |
| 6,775,701 B1 * | 8/2004 | Pan et al. | 709/226 |
| 6,854,013 B2 * | 2/2005 | Cable et al. | 709/226 |
| 2001/0023443 A1 | 9/2001 | Fichou et al. | |
| 2001/0025310 A1 * | 9/2001 | Krishnamurthy et al. | 709/223 |
| 2001/0027490 A1 * | 10/2001 | Fodor et al. | 709/238 |
| 2002/0051449 A1 | 5/2002 | Iwata | |
| 2002/0056002 A1 * | 5/2002 | Charas | 709/226 |
| 2002/0062376 A1 * | 5/2002 | Isoyama | 709/226 |
| 2002/0074443 A1 * | 6/2002 | Murdock et al. | 242/395 |
| 2002/0091810 A1 * | 7/2002 | Hundscheidt et al. | 709/223 |
| 2002/0186710 A1 | 12/2002 | Alvesalo et al. | |
| 2003/0009560 A1 * | 1/2003 | Venkitaraman et al. | 709/226 |
| 2004/0022191 A1 * | 2/2004 | Bernet et al. | 370/230 |

FOREIGN PATENT DOCUMENTS

| | | |
|---|---|---|
| EP | 0 917 390 A2 | 5/1999 |
| EP | 1 087 635 A2 | 3/2001 |
| EP | 1 091 526 A2 | 4/2001 |
| JP | 2001-333105 | 11/2001 |
| JP | 2002-124976 | 4/2002 |
| WO | WO-99/50999 A1 | 10/1999 |
| WO | WO-01/56250 A1 | 8/2001 |
| WO | WO 02/078289 A1 | 10/2002 |

OTHER PUBLICATIONS

Chen-Nee Chuah et al: "QoS provisioning using a clearing house architecture" Quality of Service, 2000. IWQOS. 2000 Eighth International Workshop on Jun. 5-7, 2000, Piscataway, NJ, USA, IEEE, Jun. 5, 2000, XP010500888, pp. 115-124.

Metin E. et al: "A novel model for inter-domain QoS management for real-time applications" Wireless Personal Multimedia Communications, 2002. tHE 5th International Symposium on Oct. 27-30, 2002, Piscataway, NJ, USA, IEEE, vol. 2, Oct. 27, 2002, XP010619142, pp. 521-525.

European Search Report dated Feb. 3, 2006 issued in EP Application No. 03 81 5036.

Australian Patent Examiner's Report No. 2, for Australian Application No. 2003264320, dated Jul. 2, 2008.

English translation of Japanese Office Action and Japanese Application No. 2004-565887.

Stefano Salsano et al: "Inter-domain QoS Signaling: the BGRP Plus Architecture" IETF Standard-Working—Draft, Internet Engineering Task Force, IETF, CH, May 2002.

Chen-Nee Chuah et al: "QoS provisioning using a clearing house architecture" Quality of Service, 2000. IWQOS. 2000 Eighth International Workshop on Jun. 5-7, 2000, Piscataway, NJ, USA, IEEE, Jun. 2000, pp. 115-124.

Metin E et al.: "A novel model for inter-domain QoS management for real-time application" Wireless Personal Multimedia Communications, 2002. The 5$^{th}$ International Symposium on Oct. 27-30, 2002, Piscataway, NJ, USA, IEEE, vol. 2, 27, Oct. 2002 pp. 521-525.

Supplemental European Search Report, filed Jan. 25, 2007.

* cited by examiner

SYSTEM AND METHOD FOR REALIZING THE RESOURCE DISTRIBUTION IN THE COMMUNICATION NETWORK

FIELD OF THE INVENTION

The present invention relates to a technical field of network communication, particularly to a system and a method for implementing resource allocation in network communication.

BACKGROUND OF THE INVENTION

As network communication technology develops, usually there are special transmission demands for specific services in network communication. Therefore, it is necessary to control network resources to meet the transmission demands of specific services, e.g., restrict File Transfer Protocol (FTP) bandwidth on the backbone network, provide higher priority for database access, realize Internet Service Providers (ISP) providing different transmission for voice, video, and other real-time services and provide bandwidth and low time delay assurance for time-sensitive multimedia services.

To this end, Internet Protocol Quality of Service (IP QOS) technology appeared. IP QOS refers to the capability of providing services over IP networks, i.e., provide required service capability for specific flows across under-layer IP networks including Frame Relay (FR), Asynchronous Transfer Mode (ATM), Ethernet, and Synchronous Digital Hierarchy (SDH); usually, the technical criteria used to measure IP QOS include:

bandwidth/throughput: which refers to the mean velocity of flows for specific application between two nodes;

time delay: which refers to the average round-trip time of a data packet between two nodes in the network;

dithering: which refers to variation of the time delay;

loss rate: which refers to the percentage of lost packets during transmission in the network and is used to measure the capability of the network in forwarding subscriber data correctly;

availability: which refers to the percentage of the available service time during which the network can provide service for subscribers.

To implement the end-to-end QOS function in the communication network, usually each network element, e.g., router, Ethernet switch, etc., shall have the capability of classifying messages and providing different processing, queue management, and dispatching for different classes of messages to meet different QOS requirements of different services, as well as providing traffic supervision and control, traffic shaping, adjusting message output speed, and determining whether to allow the subscriber's data flow to use network resources.

IP QOS includes Resource Reserve Protocol-based (RSVP-based) Integrated Service (IntServ), which is an end-to-end flow-based QOS technology; with that technology, before communication, the applications at two ends shall set up an end-to-end communication path with out-of-band RSVP signaling according to class of service and the requirement for network resources, and each router along the path shall record state information of each flow and provide corresponding service assurance.

To seek for expansibility and simplicity, IETF organization has put forward Difference Service (DiffServ) technology, which is a class-based QOS technology and is mainly used in the backbone network; the technology classifies services, performs flow control, and sets DSCP (Difference Service Code Point) domain of the message at the network ingress according to requirements of services; it distinguishes communication types in the network according to the predefined QOS mechanism and provides policies, including resource allocation, queue dispatching, and packet discarding, for Per Hop Behave (PHB); all nodes in the DiffServ domain will obey PHB according to the DSCP field in packets.

To incorporate the advantages of above IntServ and DiffServ, Integrated Service over Difference Service (IntServ over DiffServ) model is developed, which presumes the two ends of the communication network support IntServ/RSVP and regards some domains that don't support IntServ/RSVP along the end-to-end path, e.g., DiffServ domain. The DiffServ domain is regarded as a virtual connection in the IntServ domain; flow-based RSVPs are transmitted transparently in the DiffServ domain to the other end; certain bandwidth is reserved between the two ends. As shown in FIG. 1, the bandwidth from the source end to ingress of the DiffServ domain and from egress of the DiffServ domain to the destination end is guaranteed; however, in the DiffServ domain, the bandwidth is only guaranteed for aggregate flows but may not be guaranteed for individual flows. To overcome the phenomenon, the DiffServ domain shall support Aggregate Resource Reserve Protocol (RSVP).

The aggregate RSVP collects flow-based RSVP requests at ingress node of the DiffServ domain, aggregates the requests, and then requests for a total bandwidth from the egress node of the DiffServ domain. When there is a new RSVP request or a Cancel request, the aggregate RSVP adjusts the reserved bandwidth between edges of the DiffServ domain. Since the total bandwidth is exactly the sum of the bandwidths of individual flows, end-to-end QOS assurance can be provided.

Even though IntServ over DiffServ technology can implement reasonable allocation of communication network resources, it has the following disadvantages:

(1) the technology is only applicable to IP network and is tightly coupled with RSVP; it applicability is limited;

(2) the technology is only suitable for aggregate model but is not suitable for peer-to-peer model;

(3) the resulting aggregate flow from data flows is solely determined by the network, and there is no interaction with the application terminals; therefore, the network has to maintain and manage a large quantity of resource allocation policy information;

(4) it has no aggregate bandwidth pre-allocation mechanism; instead, it employs first application flow-triggered establishment mechanism;

(5) there is no aggregate bandwidth allocation mechanism between the host and the Aggregator/De-Aggregator; therefore, in the Client/Server model, the Aggregator/De-Aggregator connected with the server has to support a large amount of data flow-based queues;

(6) it has no resource preemption mechanism.

As Multi-protocol Label Switch (MPLS) technology emerges, people begin to try to solve QOS problem of traffic transmission with MPLS, including MPLS DiffServ and MPLS TE. The combination of MPLS and DiffServ is referred to as MPLS DiffServ (or MPLS CoS), which means to aggregate DSCPs or labels at edge of the network and process DSCP-based PHB or label-based forwarding at core of the network. While MPLS TE utilizes LSP supporting route presentation capability and pilot network traffic on the premise of limited network resources so as to match the actual network traffic load with the physical network resources and thereby improving QOS of the network.

DS-Aware TE is a MPLS-based indirect QOS technology, which optimizes network resource utilization through reasonable resource configuration and effective control of routing process. Since MPLS incorporates Lay-2 and Lay-3 technologies, it has intrinsic advantages in solving traffic engineering. MPLS traffic engineering optimizes network performance through searching for possible paths that meet the requirements of traffic relay with a set of route-constraining parameters. During setup, MPLS LSP carries some constraint conditions, e.g., bandwidth, affiliation property, etc. and sets up a satisfactory path through calculating restricted routes.

However, as shown in FIG. 2, if the sum of all Expedite Forwarding-type (EF)-type LSP bandwidths exceeds 50% of the total bandwidth, the time delay will exceed M1 ms, which means the traffic transmission requirements can't be met. Therefore, the EF service bandwidth shall be controlled strictly within 50%. As shown in FIG. 3, suppose the bandwidth between A and E is 200M, the bandwidths between E and C, between C and D, between D and F, as well as between F and E are all 100M, and a 20M EF flow has been established on the path through A, E, F and D through calculation of restricted paths; if another 20M EF-type flow from A to D is to be established, but it is found through calculation at point A that the bandwidth on the path through A, E, F and D meets the requirement and is optimal; because it is unable to know whether the sum of LSP bandwidth for EF flow established at point E has exceeded 50% of the total bandwidth during the calculation of restricted routes, point A only knows there is an 80M bandwidth from point E to point F. Therefore, it is possible that the time delay for EF-type LSP established at point E is not guaranteed. A solution is to expand existing Multi-protocol Label Switch Traffic Engineering (MPLS TE), i.e., Multi-protocol Label Switch Difference Service-Aware Traffic Engineering (MPLS DS-Aware TE), to inform resource occupation information at point E of point A.

The basic idea of MPLS DS-Aware TE is to enhance the class-based constraint condition on the basis of original MPLS TE, i.e., the nodes in the MPLS DS-Aware TE domain disseminate resource and occupation information according to each subscriber-defined service class to each other through Interior Gateway Protocol (IGP); during the connection is set up, MPLS signaling protocol specifies not only bandwidth but also service type, EF or Assured Forwarding (AF), which specifies the type to which the resource pertains to, so that the network resources are utilized to the best according to the subscribers' demands.

However, the existing DS-Aware TE still has the following disadvantages: it is only applicable to MPLS network; it only solves the QOS problem in a single autonomous system (AS) but can't solve the QOS problem across ASs; in addition, it can not solve the end-to-end QOS problem and doesn't support multicast resource requests, and thus its applicability range is limited.

SUMMARY OF THE INVENTION

An object of the present invention is to provide a system and method for implementing resource allocation in network communication, in order to solve end-to-end QOS problem in network communication.

The object of the present invention is attained as follows: a system for implementing resource allocation in network communication, comprising: one or more Quality of Service (QOS) Autonomous Systems, i.e., QOS domain, a separate resource allocation solution being configured in each QOS domain; end-to-end resource allocation for data flows being implemented on the basis of reserved resources in said one or more QOS domains.

Said QOS domain further comprises:
a QOS edge router (QER), which is located at the edge of the QOS domain, connected to the source, destination of data flows or other QOS domains, responsible for establishing resource reservation path for aggregate flow generated from the data flows among QOS domains and in the QOS domain, and maintains the state of the aggregate flow;
a QOS Core Router (QCR), which is located in the QOS domain and designed to establish resource reservation path for the aggregate flow in the QOS domain.

said QOS domain may equal to a route Autonomous System (AS) or AREA in the network or not.

Said QOS domain also comprises:
a Policy Server(PS), each QOS domain being configured with a policy server, which is used to maintain the resource allocation solution related with the QOS domain, i.e., cooperate with the QOS edge router and the QOS core router to allocate resources for the aggregate flow.

Said system also comprises an application terminal, which further comprises:
a source terminal, which generates outgoing data flows and send a resource request message for the data flows to the QOS edge router;
a destination terminal, which finally receives the incoming data flows, i.e., serves as the destination end of the data flows.

A method for implementing resource allocation in network communication based on the above system, comprising: dividing the communication network into a plurality of QOS domains; determining resource allocation solutions in the QOS domains, between the QOS domains, and between the application terminals and the communication network, to implement resource allocation for each aggregate flow and thereby implement end-to-end resource allocation for data flows.

Said aggregate flows are the flows obtained in the ingress edge router of QOS domain through classifying and aggregating the data flows according to the information carried in the data flows, said ingress edge router of QOS domain being the edge router through which the data flows flow into the QOS domain; said plurality of aggregate flows are distinguished by different aggregate flow IDs; said IDs are determined by said ingress edge router of QOS domain.

The first approach to implement said method comprises the following steps:

a. an application source terminal transmitting a resource request message to the ingress edge router of a QOS domain for the data flow to be transmitted;

b. said resource request message passing through the ingress edge router of each QOS domain and the egress edge router of each QOS domain in turn, adding the edge router ID of each passed QOS domain in the edge router list of the resource request message, said egress edge router of the QOS domain being the QOS edge router through which the data flows output from the QOS domain;

c. storing said edge router list in the QOS edge router connected with the destination terminal of the data flows, and continuing to send said resource request message to the destination terminal;

d. the destination terminal returning a resource allocation message towards the source terminal that sends the resource request message;

e. the QOS edge router, which receives the resource allocation message, determining the resource allocation path according to the stored edge router list, transmitting the resource allocation message for the data flows along the determined resource allocation path, judging the condition of resource reservation for aggregate flows between the passed QOS edge router and adjacent QOS edge router, performing necessary adjustment, and returning said resource allocation message to the application source terminal finally.

Said step e further comprises:

e1. the last QOS edge router, which receives the resource allocation message, allocating resources between the destination terminal and the QOS edge router, attaching the edge router list stored in the QOS edge router to said resource allocation message, and continuing to forward said resource allocation message;

e2. when the resource allocation message passing through each QOS edge router, checking the adjacent QOS edge router ID in the edge router list, and judging whether there are enough resources between the QOS edge router and the adjacent QOS edge router; if so, continuing to forward said resource allocation message and executing step e4; otherwise executing step e3;

e3. activating a resource allocation process for aggregate flows between said two QERs to perform resource allocation and continuing to forward said resource allocation message;

e4. the QOS edge router, which is connected with the application source terminal, receiving said resource allocation message, perform resource allocation, removing the edge router list from said resource allocation message, and then forwarding said resource allocation message to the application source terminal;

e5. the application source terminal receiving said resource allocation message and allocating resources.

Said activating the resource allocation process for aggregate flows to perform resource allocation in step e3 comprises:

if the QOS edge router adjacent to said QOS edge router is the next hop, said QOS edge router sending a resource request for aggregate flows to the QOS edge router at the next hop, the QOS edge router at the next hop performing resource allocation for the aggregate flows and returning a resource allocation message for aggregate flows;

if the QOS edge router adjacent to said QOS edge router is the previous hop, said QOS edge router performing resource allocation for the aggregate flows and sending a resource allocation message for aggregate flows and a resource allocation message for data flows together to the QOS edge router at the previous hop; for an IP network, the two messages may be carried in the same message;

Said previous hop or next hop is the previous hop or next hop in the data flow transmitting direction.

Said method further comprises: when receiving the resource request and resource allocation messages for data flows, the QOS core router transmits said message transparently.

Said resource request and resource allocation messages for aggregate flows comprise: source address, destination address, ID, and traffic parameter description for said aggregate flows.

The second approach to implement said method comprises the following steps:

a11. a terminal application initiating a resource request for data flows to the policy server of the adjacent QOS domain;

b11. said policy server determining the aggregate flow ID for the data flows, calculating the path in the current QOS domain for the data flows and the next QOS domain, and forwarding the resource request to the policy server of the next QOS domain;

c11. the policy server of each QOS domain processing in the same way, and the policy server of the QOS domain connected with the destination terminal forwarding the request message for the data flows to the destination terminal;

d11. at the destination terminal determining the resources that can be allocated to the data flow and returning a resource allocation message to the policy server;

e11. the policy server allocating resources for the aggregate flow at the nodes along the path through the current QOS domain and forwarding the resource allocation message for the data flows to the policy server of the previous QOS domain in the data flow transmitting direction;

f11. the application source terminal receiving said resource allocation message and allocating resources.

Said resource request and resource allocation messages for the data flows comprise: source address, destination address, and flow ID, aggregate flow ID, traffic parameter description, and QOS edge router list.

Said step a or a11 further comprises: determining said resource request message is acceptable at the ingress of each QOS domain.

Said policy server determines the resource allocation solution according to the topology information and resource occupation condition in the QOS domain where said policy server is.

Said resource allocation method for the aggregate flow comprises:

fixed allocation method: the quantity of allocated resources is equal to the quantity that is requested by the aggregate flow;

incremental allocation method: allocate the resources in a certain granularity, and the quantity of allocated resources will be greater than or equal to the quantity requested by the aggregate flow; each granularity defining a fixed quantity of resources.

Said QOS edge router is determined through judging whether the QOS domain of the interface at previous hop/next hop is identical.

Said method further comprises the processing procedures for preemption of resources allocated to an aggregate flow with low priority by an aggregate flow with high priority, i.e., when an aggregate flow with high priority creates a resource request but the pre-allocated resources are not enough, it preempts unused resources allocated to an aggregate flow with low priority, and thus performing the resource pre-allocation to the aggregate flow with high priority.

Said method further comprises the processing procedures through which the resources allocated to the aggregate flow is released, i.e., when the accumulative total of the resources to be released is determined to have reached to the predefined quantity of the resources, the resources allocated to the aggregate flow is released.

In said method, different QOS domains may use different intra-domain resource allocation methods in them; said resource allocation methods comprising signaling-based resource allocation methods and policy server-based resource allocation methods.

Said method also comprises: the application source terminal sending path detection messages to the destination terminal, the QOS edge router or policy server connected with the destination terminal storing the edge router list, detecting whether the data flow path has changed; if the data flow path has changed, establishing a new resource allocation and canceling the old resource allocation; otherwise taking no processing.

Said method also comprises: when the aggregate flow path in a QOS domain is different from the data flows path passing through the QOS domain, or when there are a plurality of equivalent cost paths in said QOS domain, establishing a tunnel between the edge router at ingress of the QOS domain and the edge router at egress of the QOS domain, and forcing to forward the data flows through the established tunnel during data flow transmission.

Said method further comprises a process of statistical adjustment of pre-allocated resources, comprising: adjusting the pre-allocated resources according to the mean rate and time delay parameters of the aggregate flow periodically.

It can be seen from the above technical solution that the method for managing the communication network through dividing it into a plurality of QOS domains according to the present invention solves the end-to-end QOS problem effectively and has the following advantages:

according to the present invention, end-to-end path information is maintained only at the edge router of the QOS domain connected with source/destination terminal, while the edge routers of other QOS domains maintain only edge-to-edge resource reservation information for aggregate flows, which reduces significantly flow state information maintained at other network nodes as well as overhead of signaling protocol processing and storage at network nodes; in order to reserve resources for aggregate flows, special queues are usually allocated for the aggregate flows; therefore, the required number of queues is reduced significantly when compared with IntServ approach, and thereby the aggregate flow state information at the network nodes is reduced;

the QOS domains are in a peer-to-peer mode to each other; therefore, the present invention is applicable to both peer-to-peer network model and hierarchical network model;

as long as IP transmission is used between the two ends, different QOS domains may use different intra-domain resource allocation modes; therefore, the method according to the present invention can facilitate interconnection between different networks, and thereby the applicability of the present invention is expanded;

the edge nodes obtain data flow identification mode through dynamic protocol; such identification mode only require IP information instead of information on application layer; therefore, the flow classification is simple to implement and needs small configuration workload;

according to the present invention, aggregate flows with high priority can preempt resources pre-allocated to aggregate flows with low priority, which ensures effective resource utilization and doesn't affect data flows that have been allocated with resources;

the resource pre-allocation or incremental resource allocation approach reduces effectively the frequency of resource allocation and release as well as the overhead on signaling protocol, and thereby makes the network stable;

since the resources are allocated on the edge routers at next hops, multicast resource requests is supported and setup of resource reservation path can be further accelerated;

in most cases, according to the present invention, there are enough resources among edge routers of QOS domains, and thereby it is unnecessary to initiate the intra-domain resource allocation mechanism; instead, only QER processing is required for end-to-end resource allocation; therefore, the mean path setup time is relatively short.

DETAILED DESCRIPTION OF THE EMBODIMENTS

Figure 1:
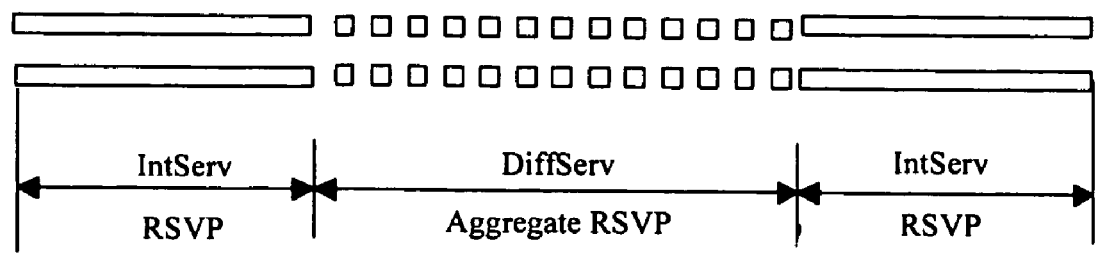
FIG. 1 is a schematic diagram of DiffServ-based IntServ model.
Figure 2:
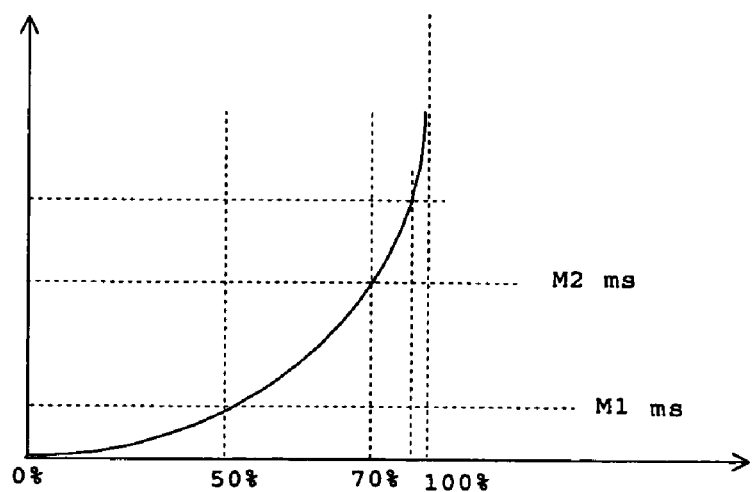
FIG. 2 is a resource allocation curve diagram of DS-Aware TE technical solution.
Figure 3:
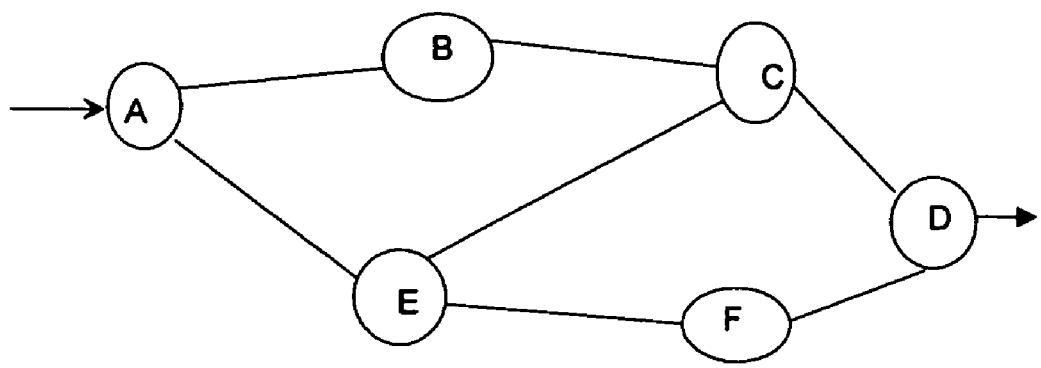
FIG. 3 is a networking diagram of DS-Aware TE.

The present invention solves end-to-end QOS problem for data flows in network communication and can be referred to as Class-Based Integrated Service (CB-IntServ). It combines the control plane of IntServ with the forwarding plane of DiffServ to provide end-to-end QOS assurance in any network, whatever the scale or topology of the network is. In addition, the present invention can be implemented both in individual domains, across domains and across ASs.

Providing end-to-end QOS assurance for individual data flows doesn't means steam-based end-to-end paths must be used; instead, for a single network device, what is only required is to reserve enough resources for data flows passing through it, i.e., resource reservation can be aggregated, this is because, in the case of resource reservation, employing multiple QOS queues for the same class of data flows delivers the same effect as employing only one queue substantially; however, in view that different classes of services have different QOS requirements and different traffic models, the resources for them have to be treated differently.

In order to determine the quantity of resources to be reserved at a network device, the resource request for data flows has to be sent to every node (i.e., network device) on the transmission path; that function can be implemented through signaling, policy server, or other approaches.

Similar to the case of a single network device, for a segment in the network, it is conceivable that the QOS of each data flow passing through that segment can be assured as long as the resources reserved for the class of service among the edges of the segment are enough; likewise, in order to determine the quantity of resources to be reserved in a segment, the resource request for data flows has to be informed of every segment.

Usually, the resource reservation comprises two stages, i.e., resource request stage and resource allocation stage; in RSVP, the resource allocation follows the resource request; for a single data service, employing resource pre-allocation will severely waste network resources and result in frequent signaling interaction and affect network stability; however, for an aggregated class (i.e., an aggregate flow), the probability of concurrency of all data flows is very low due to statistical multiplexing; in addition, the number of aggregate flows are limited, it is therefore possible to pre-allocate resources for aggregate flows and increase the quantity of resources dynamically in case that the pre-allocated resources are not enough.

In detail, the system for implementing resource allocation in network communication according to the present invention comprises a plurality of QOS Autonomous Systems hereinafter referred to as QOS-AS or QOS domain, each of which is managed separately and a unified QOS policy is used in one QOS domain; said QOS-AS may equal to a route AS or an AREA or not, and the simplest QOS-AS is a device with its interfaces.

Internally, a QOS-AS may be implemented through a plurality of protocols, e.g., IP, ATM, FR, MPLS and Ethernet, or with sufficient bandwidth and transparent to the external.

Hereunder the present invention is further described, with an IP network as the example. The QOS domain according to the present invention comprises:

QOS Edge Routers (QER), which are located at the edge of a QOS-AS and are connected to application terminals or other QOS-ASs, responsible for classification, labeling, policy, and shaping, etc., for the entire QOS-AS, serving as signaling start point and end point in the QOS-AS, and responsible for establishing resource reservation paths for aggregate flows between the edges and maintaining states of the aggregate flows;

If a QER is connected with another QOS-AS or an application terminal, resources reservation between the QER and the application terminal or between the QER and a QER of another domain can be performed through a certain signaling protocol; if connected with the application terminal, the QER is called as QOS Application Edge Router (QAER), which stores the states of data flows;

A QER may belong to two QOS-ASs; in that case, the link on the QER also belongs to the two QOS-ASs, and the QER is virtualized as two QERs;

If connected with a QOS-AS in a heterogeneous network (e.g., ATM), the QER is also responsible for mapping QOS parameters between the different networks.

QOS Core Router (QCR), which is located in the QOS-AS and is responsible for only forwarding messages, running the signaling protocol in the QOS domain, establishing resource reservation paths for aggregate flows between QERs, and storing state information of the aggregate flows, since the QER has performed classification, labeling, policy, and shaping, etc.;

Both QCR and QER are defined with respect to a certain data flow; it is possible that a physical router may be a QCR for some data flows and a QER for some other data flows at the same time.

Application terminals, which may be intelligent terminals server, PC, PDA, or serving as s sources or destinations for data flows; an application terminal sends resource request messages to the network via QAER; if the resources meet the requirements, it will perform communication with assured QOS; if the communication is bidirectional, the application terminal is both the sender and the receiver and will request for or reserve resources in both directions; in addition, the application terminal can make the QAER identify it exclusively by a unique identifier, e.g., address or port information sent from the application terminal.

Policy server: when an application terminal requests for resources actively to the network, the network will decide whether to allocate resources for it according to a certain policy, e.g., charge, security, etc.; if the number of data flows is small, that function may be implemented on the QAER; however, when scale of the network and subscriber is expanded, policy servers are required to do the work; in addition, the policy server may be active to configure the QERs of QOS domains and to allocate resources for aggregate flows, wherein the policy server allocates resources according to topology information and link resource occupation condition in the QOS domains.

The ultimate approach to solve QOS problem in network communication is to assure end-to-end resources (e.g., bandwidth) for data flows; the method for resource allocation in network communication according to the present invention employs technologies including assurance by domain, pre-allocation, and dynamic adjustment (including incremental allocation and statistical adjustment) to solve QOS problem; the method according to the present invention comprises resource allocation solutions in a QOS domain, among QOS domains, and between the application terminal and the network, wherein:

resource allocation solution in a QOS domain: the data flows are aggregated into a limited number of aggregate flows, e.g., Expedited Forwarding (EF) and Assured Forwarding (AF) defined in DiffServ system, at the QERs of the QOS domain, and the resources are allocated for the aggregate flows from edge to edge in the QOS domain, which is equivalent to establishing a dedicated aggregate flow tunnel between QERs of the QOS domain;

in addition, a unique IDs shall be determined for the aggregate flows with a certain method, e.g., Diffserv Code Point in IPv4/v6, flow-label in IPv6, EXP in MPLS, or 802.1p in Ethernet etc., and mapping to each other is required across heterogeneous networks;

the resource allocation method may be implemented through signaling or policy server;

the requirements for the signaling protocol in a QOS domain include:

1. it shall initiate from and end at QERs;
2. it shall run on the QCRs along the path;
3. it shall have request, allocation, cancel, acknowledgement, and error report messages;
4. the data carried in the request message shall include source QER, destination QER, aggregate flow ID, and traffic parameter description, etc;
5. the data carried in the allocation message shall include: source QER, destination QER, aggregate flow ID, acknowledged or modified traffic parameter description, etc.;
6. it shall support incremental allocation, i.e., add or reduce resources for a certain aggregate flow in a certain granularity on the basis of originally allocated resources;
7. it shall support resource preemption, i.e., an aggregate flow with high priority can preempt unused resources allocated to an aggregate flow with low priority upon request;
8. it shall guarantee reliable transmission based on the protocol on transport layer;
9. it shall support multicasting;
10. every node along the path shall maintain the state of each aggregate flow.

The requirements for policy server include:

1. it can obtain link state (i.e., topology information of the QOS domain) from network devices of the QOS domain as well as information on network resource utilization and source idlesse in the QOS domain;
2. it can calculate edge-to-edge paths that meet the requirements of resource requests;
3. it can configure the quantity of reserved resources at every node along the path.

Resource allocation requires support from network nodes (network devices along the transmission path); if the network devices have enough capability, they can reserve resources for every <source QER, destination QER, and aggregate flow ID> triplet, and perform classification and dispatching on the basis of the triplets; if the devices haven't enough capability, they may reserve resources for every aggregate flow ID and perform classification and dispatching on the basis of the aggregate flows; in either of above cases, each network node has to maintain <source QER, destination QER, aggregate flow ID, reserved resources> information.

Resource allocation among QOS domains: after the resources are allocated and reserved for aggregate flows in QOS domains, an edge-to-edge channel is formed; however, to achieve end-to-end resource reservation, the edge-to-edge channels in multiple domains have to be connected; therefore, resources have to be allocated among QOS domains; through combining resource allocation in QOS domains and resource allocation among QOS domains, an edge-to-edge resource reservation channel can be established across the entire network;

similarly, the resource allocation among QOS domains may be implemented on the basis of signaling or policy server;

the requirements for the signaling protocol among domains include:

1. it only runs between QERs and is unnecessary to run between QCRs or between QCR and QER;

2. it is unnecessary to reserve resources if the QER belongs to two QOS domains at the same time;

3. it shall have request, allocation, cancel, acknowledgement, and error report messages;

4. the data carried in the request message shall include source QER, destination QER, aggregate flow ID, and traffic parameter description, etc;

5. the data carried in the allocation message shall include: source QER, destination QER, aggregate flow ID, acknowledged or modified traffic parameter description, etc.;

6. it shall support incremental allocation, i.e., add or reduce resources for a certain aggregate flow in a certain granularity on the basis of originally allocated resources;

7. it shall support resource preemption, i.e., an aggregate flow with high priority can preempt unused resources allocated to an aggregate flow with low priority upon request;

8. it shall guarantee reliable transmission based on the protocol on transport layer;

9. it shall support multicasting;

10. the QERs shall maintain the state of aggregate flows.

The requirements for policy server include:

1. each QOS domain shall have its own policy server; it is unnecessary that the entire network should be managed by the same policy server;

2. the policy servers shall exchange edge-to-edge resource reservation and resource idlesse information in their respective domains with each other;

3. it can obtain resource utilization information between QERs in two domains;

4. after the policy server in a QOS domain calculates the edge-to-edge resource path in the QOS domain, it informs the path to the policy server in the next QOS domain;

5. the policy server in each domain is responsible for configuring the nodes in the domain along the edge-to-edge path across the entire network;

If the QOS domains have enough capability, they may reserve resources for every (source QER, destination QER, aggregate flow ID) triplet and perform classification and dispatching on the basis of the triplets; if the QOS domain haven't enough capability, they may reserve resources for every aggregate flow ID and perform classification and dispatching on the basis of the aggregate flows.

Resource allocation between the application terminals and the network: after the edge-to-edge resource reservation channel across the entire network is established, it is necessary to perform resource allocation between the application terminals and the network and adjust edge-to-edge resource reservation across the network, in order to finally implement end-to-end resource allocation for data flows;

There are two approaches for resource allocation between the application terminals and the network: one is to allocate resources for aggregate flows; the other is to allocate resources for data flows; the second approach is a step of the first approach, i.e., pre-allocation;

The first approach, i.e., allocate resources for aggregate flows, is similar to resource allocation among QOS domains; since the allocated resources are for aggregate flows, the destination address of remote application is unknown, and therefore the reservation is not end-to-end; there are two approaches for resource allocation for aggregate flows: one is that the QAER allocates resources actively; the other is that the application terminals request for resources to QAERs via the policy servers; in case that the QAER host allocates resources actively, the host don't participate in resource allocation, and the resources for aggregate flows are only allocated on the QAER, which may be regarded as a proxy; in case that source allocation is performed through policy server, the host may request for resources to the policy server with out-of-band, in-band mechanisms, and, after the request is accepted, the policy server informs the QAER to allocate resources;

The second approach is to allocate resources for data flows and it is a part of end-to-end resource allocation; since the application terminals are diverse, the life cycles of data flows are different; therefore, the resource allocation is performed through a dynamic end-to-end signaling protocol; the requirements for the end-to-end signaling include:

1. it can run between an application terminal and the QAER as well as between application terminals;

2. QERs shall be aware of the protocol and process accordingly; however, messages shall be transmitted between QERs transparently through the end-to-end signaling protocol;

3. it shall have request, allocation, cancel, acknowledgement, and error report messages;

4. the data carried in the request message shall include: source address, destination address, flow ID, proposed aggregate flow ID, traffic parameter description, and list of passed QERs, etc.;

5. the data carried in the resource allocation message shall include: source address, destination address, flow ID, allocated aggregate flow ID, acknowledged or modified traffic parameter description, and end-to-end QER list, etc.;

6. as the request message is transmitted in the network and, the passed node shall identify whether it is a QER itself; if so, the node adds the its ID in the QER list in the message;

7. the QER list shall be removed from the request/allocation message between the QER and the application terminal;

8. when the end-to-end allocation message is returned to a QER, the QER shall check whether enough resources have been allocated for the aggregate flows between itself and another QER; if not, the signaling protocol mechanism in the domain/between the domains is triggered to perform incremental resource allocation between the two QERs;

9. the QER connected to the source shall determine the class of the aggregate flow; it may use the proposed class in the request message or assign a different class;

10. the request message shall be retransmitted periodically to detect whether the QERs along the end-to-end path have changed;

11. it shall guarantee reliable transmission with a protocol on transport layer;

12. it shall support multicasting;

13. the protocol used may be the same as the protocol for resource allocation between domains; however, the working between application and QER or between QERs may be a different one;

14. the resource allocation protocol in the domain can be distinguished easily;

15. only the QAER maintains the states of data flows; the QAER connected with the destination shall contain a QER list; other QERs don't maintain the states of data flows.

The resource allocation process for data flows as described above is an end-to-end resource allocation process; whereas the resource allocation process for aggregate flows comprises resource allocation between application terminal and QAER, resource allocation in QOS domains, and resource allocation between QOS domains and are performed in individual sections; the combination of the two resource allocation mechanisms constitute the QOS resource allocation process across the entire network.

To simplify the implementation, the end-to-end signaling protocol may be the same as that used between QOS domains, i.e., messages for data flow and aggregate flow are transmitted through the same protocol, however, in different application environments, the protocol behaves as the resource allocation protocol for data flows or resource allocation protocol for aggregate flows.

Figure 4:
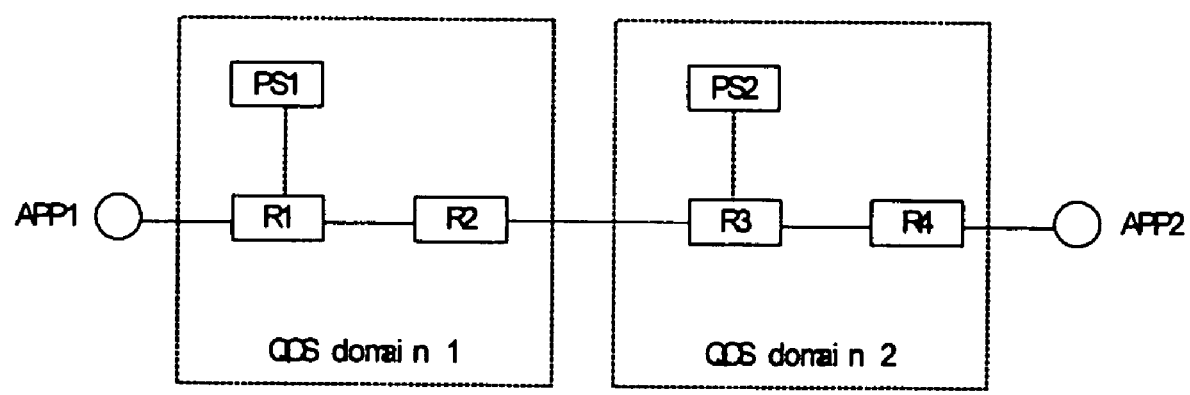
FIG. 4 is structural diagram 1 of the system according to the present invention.
Figure 5:
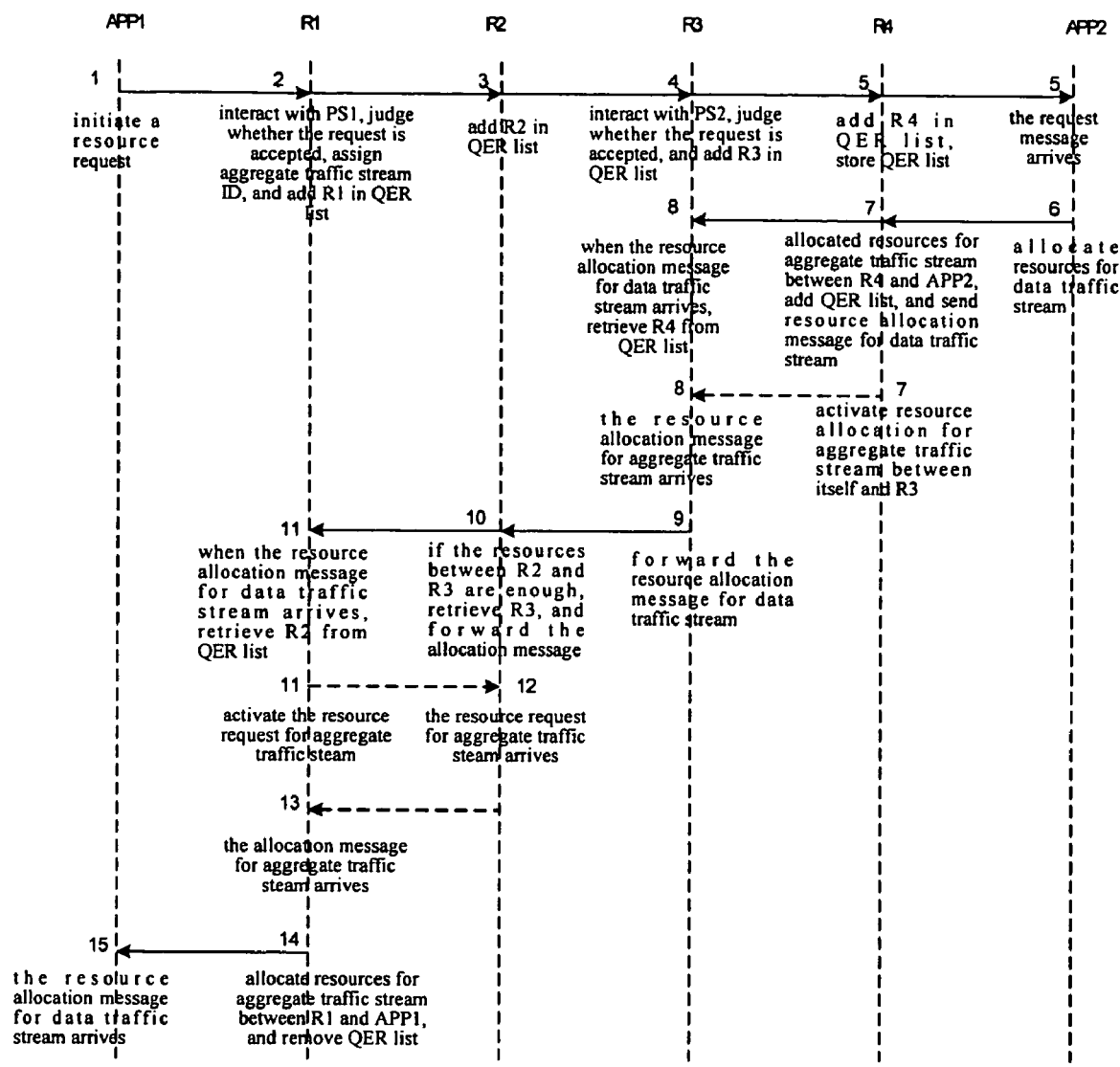
FIG. 5 is a diagram of procedures of the method according to the present invention.

Hereunder, the method according to the present invention (i.e., the entire process of end-to-end resource allocation) is described with reference to the attached drawings:

As shown in FIG. 4, APP1 is the source terminal, APP2 is the destination terminal, R1-R4 are four QOA edge routers, PS1 is the policy server of QOS domain 1 (QOS-AS1), and PS2 is the policy server of QOS domain 2 (QOS-AS2); the resource allocation process in the network structure in FIG. 4 is shown in FIG. 5, comprising:

step 1: the source terminal APP1 initiating a resource request message containing source address <APP1>, destination address <APP2>, flow ID <Source Port, Dest Port, Protocol>, proposed aggregate flow ID <DSCP1>, and traffic parameter description, etc.;

step 2: the edge router R1 directly connected with source terminal APP1 interacting with the policy server PS1 to judge whether the request can be accepted; if the request is rejected, returning a request failure message; if the request is accepted, determining that the aggregate flow ID is DSCP2, which may be identical to or different from DSCP1; then checking whether there are enough resources for aggregate flow DSCP2 between the source terminal APP1 and the edge router R1; if the resources are not enough, returning a request failure message; otherwise adding R1 ID in the QER list of the resource request message and forwarding the resource request message;

step 3: when the resource request message passes through the edge router R2, R2 confirming itself is the QER of the data flow through detecting that the interface at the previous hop or the next hop belongs to different QOS-ASs, adding ID of itself in the QER list of the request message, and forwarding the resource request message;

step 4: at the edge router R3, since the message enters into a new QOS domain, the edge router R3 interacting with the policy server PS2 of QOS-AS2 to judge whether to accept the resource request; if the request is rejected, R3 returning a resource request failure message; otherwise R3 forwarding the request message;

step 5: at the edge router R4, which is directly connected with the destination terminal APP2, confirming itself is the QAER for the data flow through detecting that the interface at the next hop is connected with the destination terminal, adding ID of itself in the QER list of the request message, and judging whether there are enough resources for the aggregate flow between the edge router R4 and the destination terminal APP2; if the resources are not enough, returning a request failure message to the source terminal APP1; otherwise storing the QER list, and forwarding the request message with the removed QER list to the destination terminal APP2;

step 6: the destination terminal APP2 determining the available resources for data flow and returning an allocation message to the source terminal APP1;

steps 7 and 8: at the edge router R4, allocating resources for the aggregate flow between the edge router R4 and the destination terminal APP2, adding the QER list in and forwarding the resource allocation message, and judging whether there are enough resources between the edge router R4 and the edge router R3 at the same time; if the resources are enough, transmitting the resource allocation message for the data flow to the edge router R3; otherwise, at the edge router R4, activating the resource allocation process for the aggregate flow between the edge router R4 and the edge router R3, and at the same time transmitting the resource allocation message for the data flow and a resource allocation message for the aggregate flow together to the edge router R3, wherein in an IP network, the two messages can be included in the same protocol packet, and when the messages reaches to the edge router R3, the edge router R3 retrieves the R4 ID from the QER list;

if a node between the edge router R4 and the edge router R3 can't meet the resource allocation requirements, it sending an allocation failure message for the aggregate flow to the edge router R4 as well as a request failure message for the aggregate flow to the edge router R3; when receiving the failure messages, the edge router R4 sending an end-to-end allocation failure message to the destination terminal APP2;

steps 9, 10 and 11: when the allocation message passes through the edge router R3, the edge router R2, or the edge router R1, each edge router (R3, R2, or R1) retrieving the previous QER ID from the QER list, checking whether there are enough reserved resources between itself and the previous QER or the next QER; if the resources are enough, the QER forwarding the allocation message to the source terminal APP1, otherwise activating the signaling protocol process in the domain, between the domains to allocate resources; if the allocation is successful, the QER continuing to forward the end-to-end resource allocation message to the source terminal APP1; if the allocation fails, the QER sending a request failure message to the source terminal APP1 and sending an allocation failure message to the destination terminal APP2;

if the QER in a QOS domain doesn't record the state of resource reservation for aggregate flow between itself and the previous QER in the transmission direction of the data flow, the method used for resource adjustment for the aggregate flow shall be slightly different from that described in steps 7 and 8; please refer to steps 12, 13 and 14, the method shall be: the edge router R1 checking whether there are enough resources between itself and the edge router R2; if the resources are enough, removing the QER list and sending the end-to-end resource allocation message to the source terminal APP1; if the resources are not enough, the edge router R1 sending a resource request message for the aggregate flow to the edge router R2; when receiving the resource allocation message from the edge router R2, removing the QER list and sending the end-to-end allocation message to the source terminal APP1, such a resource allocation mode supports multicast resource allocation and can speed up establishment of the resource reservation path;

step 15: the source terminal APP1 allocating resources for the data flows and accomplishing the end-to-end resource allocation process.

Figure 6:
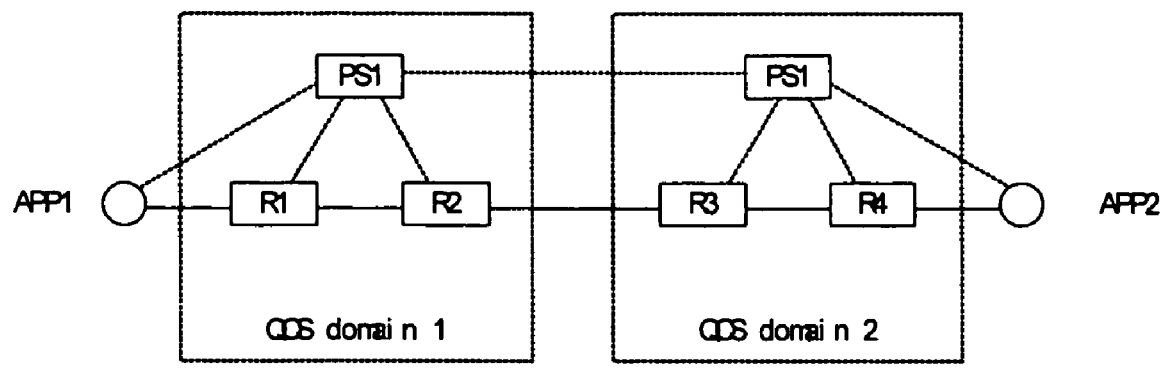
FIG. 6 is a diagram of working procedures of the policy server shown in FIG. 4.

Hereunder the working procedures of the policy server in the method according to the present invention are described in detail with reference to the attached drawings. As shown in FIG. 6, there is a policy server in each of the QOS-Ass, which is referred to as PS1 and PS2 respectively; the policy server PS1 and the policy server PS2 exchange information about their QOS-ASs and the managed edge nodes with each other and collect information on resource allocation at the nodes in QOS-ASs; in addition, the policy server PS1 and the policy server PS2 allocate resources for aggregate flows in domains and between the QERs and the application terminals and cooperate with each other to allocate resources for the aggregate flows between the QOS domains; the specific procedures include:

1. the source terminal APP1 initiating a resource request to the policy server PS1, with the destination address as destination terminal APP2; said resource request message containing source address <APP1>, destination address <APP2>, flow ID <Source Port, Dest Port, Protocol>, proposed aggregate flow ID <DSCP1>, and traffic parameter description, etc.;

2. the policy server PS1 determining the aggregate flow ID as DSCP2, which may be identical to or different from DSCP1, learning that the path will enter into QOS-AS2 through searching in the route table, etc., of the nodes in the domain, and forwarding the request message to the policy server PS2;

3. the policy server PS2 learning that the destination terminal APP2 is directly connected with the current domain through searching in the route table, etc., of the nodes in the domain, and forwarding the request message to the destination terminal APP2;

4. at the destination terminal APP2, determining the resource that is available to the data flow and returning the resource allocation message to the policy server PS2;

5. the policy server PS2 checking whether there are enough resources between the edge router R3 and the edge router R4; if there are not enough resources, further checking whether there are enough remaining resources; if the remaining resources are not enough, sending a request failure message to the policy server PS1 and sending a resource allocation failure message to the destination terminal APP2; if the remaining resources are enough, allocating resources for the aggregate flows between the edge router R3 and the edge router R4 in an incremental manner, and forwarding the allocation message to the policy server PS1;

6. processing at the policy server PS1 being the same as that at the policy server PS2;

7. allocating resources at the source terminal APP1.

Figure 7:
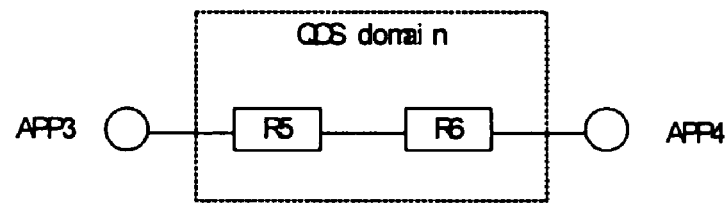
FIG. 7 is structural diagram 2 of the system according to the present invention.

In the case of a single IP QOS domain, the simplified processing procedures of the method according to the present invention are as follows:

in the single IP QOS domain as shown in FIG. 7, above procedures can be simplified as follows: the end-to-end signaling protocol and the protocol for resource allocation in the domain are combined into one protocol, and it is unnecessary to record the QER list; the specific working procedures comprise:

1. the source terminal APP3 initiating a resource request message containing source address <APP3>, destination address <APP4>, flow ID <Source Port, Dest Port, Protocol>, proposed aggregate flow ID <DSCP3>, and traffic parameter description, etc.;

2. determining the aggregate flow ID as DSCP4 at the edge router R5 directly connected with source terminal APP3, which may be identical to or different from DSCP3;

3. transmitting the end-to-end request at the nodes between the edge router R5 and the edge router R6 transparently;

4. at the edge router R6, recording the data flow ID and corresponding aggregate flow ID;

5. at the destination terminal APP4, determining the available resources for the flow, returning an allocation message to the source terminal APP3; said message containing application address <APP3>, destination address <APP4>, flow ID <Source Port, Dest Port, Protocol>, allocated aggregate flow ID <DSCP4>, and acknowledged traffic parameter description, etc.;

6. allocating resources for the aggregate flow on the entire path between the edge router R6 and the edge router R5; if the resources are not enough, returning a resource request failure message to the source terminal APP3 and sending an allocation failure message to the destination terminal APP4;

7. at the edge router R5, recording the data flow ID and the corresponding aggregate flow ID;

8. at the source terminal APP3, allocating resources for the data flow.

The method according to the present invention further comprises the processing procedures in case that the end-to-end path changes:

when the end-to-end path changes, the control plane shall be aware of such change and change the resource allocation accordingly.

In signaling protocol processing case, as shown in FIG. 4, the processing procedures comprise:

1. storing the QER list information in the state of data flow on the QAER, i.e., the edge router R4, that is directly connected with the destination terminal APP2;

2. the source terminal APP1 retransmitting the end-to-end request message periodically to detect whether the path has changed;

3. when the request message reaches to the QAER, i.e., the edge router R4, that is directly connected with the destination terminal APP2, there being three cases: 1) the current QAER is different from the previous passed QAER; herein the current QAER is referred to as the edge router R4'; 2) the current QAER is the same as the previous passed QAER, but the QER lists thereof are different; 3) the QAERs are the same, and so are the QER lists; then going to steps 4, 5 and 6, respectively;

4. in the case of above 1), the new QAER, i.e., the edge router R4' returning a new end-to-end allocation message; the old QAER, i.e., the edge router R4, as the result of timeout, sending a Cancel Allocation message to the source terminal APP1 and sending a Cancel Request message to the destination terminal APP2;

5. in the case of above 2), the edge router R4 creating new flow state information and sending a new allocation message (containing the new QER list) to the source terminal APP1, and, after the flow state information (containing the old QER list) times out, sending a Cancel Allocation message to the source terminal APP1;

6. in the case of above 3), no processing.

In the case of policy server processing, the processing procedures are as follows:

1. storing the list of passed QERs in the current QOS domain in the data flow state at the policy server PS1 and the policy server PS2;

2. the source terminal APP1 retransmitting the end-to-end request message periodically to detect whether the path has changed;

3. when the request message reaches to the policy server PS2 via the policy server PS1, the policy server PS1 and the policy server PS2 calculating whether the passed QERs in the corresponding domains have changed, respectively; if the QERs have changed, canceling the resource allocation for the aggregate flow between the old QERs, and allocating resources for the aggregate flow between the new QERs;

4. the policy server PS1 and the policy server PS2 cooperating with each other to calculate whether the pair of QERs across domainss has changed; if the pair of QERs has changed, canceling the resource allocation for the aggregate flow between the old QERs, and allocating resources for the aggregate flow between the new QERs.

The method according to the present invention further comprises processing procedures of resource dispatching for the aggregate flow; said processing procedures comprising the following three procedures:

statistical adjustment of pre-allocated resources: during initialization, edge-to-edge resources are pre-allocated, so that frequent signaling interaction and resource allocation and release can be avoided in most cases; however, if the pre-allocated resources don't meet the statistical characteristics of the aggregate flow, such a mechanism will not provide expected efficacy; thus adjustment of pre-allocated resources has to be performed periodically or aperiodically; for end-to-end signaling, the time interval between such adjustments is longer;

the adjustments may be performed manually or automatically, whenever the resources are found as insufficient or excessive for a long time; it can be seen that the basis of such adjustments is measurement of usage of edge-to-edge resources, as follows:

1. recording each pair of edge-to-edge pre-allocated resources at the QER;
2. setting a measuring interval;
3. calculating the edge-to-edge mean rate, time delay, etc., within the interval;
4. adjusting the resources within the next internal to meet the statistical characteristics within the next internal.

Usually, the subscriber's participation is required when the bandwidth is adjusted between a host and the QAER, for example, when the subscriber subscribes some kind of service in an in-band or out-of-band manner, the network allocates appropriate bandwidth to the subscriber.

Incremental adjustment: as the result of aggregation, edge-to-edge resource allocation is incremental, that is to say, adding or reducing resources based on originally allocated resources, instead of updating resources in an end-to-end manner just like the end-to-end. The two signaling protocols shall be different from each other in the request and allocation messages so as to enable the messages to differ from the messages for resource reservation;

to further reduce frequent resource dispatching, resources may be allocated in an incremental manner at a certain granularity (called resource granularity); each resource granularity determines a fixed quantity of resources, e.g., each granularity can be determined as 100K; for example, if the requested quantity of resources is 350K, 4 granularities may be allocated to meet the current resource request; at the same time, it can meet subsequent resource requests to certain extent, i.e., the quantity of allocated resources for the current aggregate flow is greater than or equal to the requested quantity of resources;

during resource release, if the quantity of resources to be released hasn't reached to the boundary of the granularity, no resources will be released for the aggregate flow, until the accumulative quantity of resources to be released reaches to the boundary of the granularity.

Resource preemption: though edge-to-edge resources are pre-allocated for aggregate flows, an aggregate flow may preempt resources pre-allocated to an aggregate flow with low priority when it has a new resource request but the pre-allocated resources are not enough; the sequence is: from the lowest priority up to the current priority;

when the preempted resources are released, starting from the aggregate flow with the next priority, it will judge whether the current resources of the aggregate flow are less than the pre-allocated resources, and release the resources to it if so.

The unit of resource preemption is also resource granularity.

For a QOS domain with only one router and interfaces thereof, the above three processing procedures can also be performed at a single router.

In the present invention, when requesting for resources between the application terminal and the network, the request message carries the flow ID, through which the QAER can therefore identify the flow and set priority for it according to the allocated aggregate flow ID; the QAER also determines the Commit Access Rate (CAR) to ensure the data flow meets the stated traffic characteristics.

In the present invention, local resource dispatching shall take advantage of IP statistical multiplexing; the reserved resources of the aggregate flows can be shared dynamically among the aggregate flows; in a processing cycle, unused resources of aggregate flows with high priorities can be used by aggregate flows with low priorities.

In the present invention, to ensure the data flow path equals to the aggregate flow path (i.e., ensure the data flow is transmitted along the reserved path), the following solution may be used: in a QOS-AS, the path of a data flow is defined with source address and destination address of the flow, while the path of an aggregate flow is defined with addresses of the QERs at two ends; in special cases, it is possible that the two paths don't equal to each other, for instance:

1. Route policy or policy-based routing is enforced at a node along the path, causing the route is not the Metric-based optimal route; such a node is usually an ASBR or ABR;
2. There are multiple equivalent paths in the QOS-AS but resource allocation is only carried out on one of them; resources are not allocated on other paths;

In the first case, if QER equals to ASBR/ABR and there is no node on which route policy/policy-based routing is enforced in the QOS-AS, the two paths equal to each other; if the path of the aggregate flow is different to that of the data flow passing through the QOS-AS, the issue can be solved through establishing a tunnel between the QERs and forcing to forward the application flows through the tunnel;

In the second case, the issue can be only solved through establishing a tunnel between the QERs.

During the working process, the end-to-end signaling protocol involved in the present invention shall identify the QERs for the flow as follows:

At the network device, configuring the interfaces of it into 3 types:

a. Subscriber interface, which is connected to the subscriber directly or via a network without QOS;
b. Interface in QOS-AS, which is directly connected to a node in the QOS-AS; (default)
c. Interface between QOS-ASs, which is connected to a node in a different QOS-AS.

If a QER is cross two QOS-ASs, all of its interfaces shall be configured as interfaces between QOS-ASs, and the QOS-AS IDs shall be configured for it.

When a request message reaches to the network device, it calculates the interface at previous hop/next hop, and determines the QER according to the combination of interfaces at next hop/previous hop as follows:

a/a: Connected to subscribers at both ends, QAER;
a/b or b/a: QAER;
a/c or c/a: QAER;
b/b: not QER;
b/c or c/b: QER;
c/c: Judging whether the QOS-AS IDs of the two interfaces are the same; if they are not the same, it is a QER; otherwise it is not a QER.

The invention claimed is:

1. A system for implementing class-based end-to-end resource allocation for data flows in network communication, comprising:
   a source terminal;
   a destination terminal;
   a plurality of Quality of Service (QOS) domains with separate resource allocation solutions, comprising a QOS domain connected to the source terminal, a QOS domain connected to the destination terminal and at least one other QOS domain;
   wherein each of the QOS domains comprises a plurality of QOS Edge Routers (QERs), a plurality of QOS Core Routers (QCRs) and a policy server;
   wherein the QERs, connected with the source terminal, the destination terminal and a second QER of another QOS domain, are adapted to establish a resource reservation path between edges of the QOS domains for an aggregate flow generated from data flows from the source terminal, wherein only the QERs connected with the source terminal and the destination terminal are adapted to maintain the state of the aggregate flow, while the QERs other than the QERs connected with the source terminal and the destination terminal are adapted to maintain only an edge-to-edge resource reservation for the aggregate flow;
   the QCRs, connected with the QERs in the same QOS domain, are adapted to establish an intra-domain resource reservation path between the QERs for the aggregate flow;
   the source terminal is adapted for generating the data flows and sending a resource request message for the data flows to the QERs;
   the destination terminal is adapted for receiving the data flows; and
   the policy server, cooperating with the QERs and the QCRs in the same domain, is adapted to perform resource allocation for the aggregate flow.

2. A method for implementing class-based end-to-end resource allocation for data flows in network communication based on the system of claim 1, comprising:
   establishing a resource reservation path between edges of the QOS domains for an aggregate flow generated from data flows from the source terminal by the QERs connected with the source terminal, the destination terminal and a QER of another QOS domain, wherein only the QERs connected with the source terminal and the destination terminal are adapted to maintain the state of the aggregate flow, while the QERs other than the QERs connected with the source terminal and the destination terminal are adapted to maintain only an edge-to-edge resource reservation for the aggregate flow;
   establishing an intra-domain resource reservation path between the QERs for the aggregate flow, by the QCRs connected with the QERs in the same QOS domain; and
   performing resource allocation for the aggregate flow by the policy server.

3. The method according to claim 2, further comprising:
   a. transmitting a resource request message from the source terminal to the ingress QER of a QOS domain for the data flows wherein said resource request message passes through the ingress QER of each QOS domain and an egress QER of each QOS domain in turn, adding the QER ID of each passed QOS domain in the edge router list of the resource request message;
   b. storing said edge router list in the QER connected with the destination terminal of the data flows, and continuing to send said resource request message to the destination terminal;
   c. returning a resource allocation message towards the source terminal from the destination terminal; and
   d. determining the resource allocation path according to the stored edge router list, transmitting the resource allocation message for the data flows along the determined resource allocation path, judging the condition of resource reservation for aggregate flows between the passed QER and an adjacent QER, performing resource reservation adjustment, and returning said resource allocation message to the source terminal using the QER which receives the resource allocation message.

4. The method according to claim 3, wherein said step d further comprises:
   d1. allocating resources between the destination terminal and the QER, attaching the edge router list stored in the QER to said resource allocation message, and continuing to forward said resource allocation message with the last QER which receives the resource allocation message;
   d2. when the resource allocation message passes through the QER of each QOS domain, checking the adjacent QER ID of the QOS domain in the edge router list, and judging whether there are enough resources between the QER and the adjacent QER; if so, continuing to forward said resource allocation message and executing step d4; otherwise executing step d3;
   d3. activating a resource allocation process for aggregate flows to perform resource allocation and continuing to forward said resource allocation message;
   d4. receiving said resource allocation message, performing resource allocation, removing the edge router list from said resource allocation message, and then forwarding said resource allocation message to the source terminal with the QER connected with the source terminal;
   d5. receiving said resource allocation message and allocating resources at the source terminal.

5. The method according to claim 4, wherein said activating the resource allocation process for aggregate flows to perform resource allocation in step d3 comprises:
   if the adjacent QER is the next hop, said QER sending a resource request for aggregate flows to the adjacent QER at the next hop, the QER at the next hop performing resource allocation for the aggregate flows and returning a resource allocation message for aggregate flows;
   if the adjacent QER is the previous hop, said QER performing resource allocation for the aggregate flows and sending a resource allocation message for aggregate flows and a resource allocation message for data flows together to the adjacent QER at the previous hop;
   wherein for an IP network, the two messages are carried in the same message;
   and
   said previous hop or next hop being the previous hop or next hop in the data flow transmitting direction.

6. The method according to claim 5, wherein said resource request and resource allocation messages for aggregate flows comprise: source address, destination address, ID, and traffic parameter description for said aggregate flows.

7. The method according to claim 4, wherein said resource allocation method for the aggregate flow comprises at least one of:

a fixed allocation method: wherein the quantity of allocated resources is equal to the quantity that is requested by the aggregate flow; or an incremental allocation method: wherein resources are allocated in a certain granularity, and the quantity of allocated resources will be greater than or equal to the quantity requested by the aggregate flow; each granularity defining a fixed quantity of resources.

8. The method according to claim 3, further comprising: when receiving the resource request and resource allocation messages for data flows, the QCR transmitting said message transparently.

9. The method according to claim 3, wherein said resource request and resource allocation messages for the data flows comprise: source address, destination address, and flow ID, aggregate flow ID, traffic parameter description, and QOS edge router list.

10. The method according to claim 3, wherein said step a further comprises: determining that said resource request message is acceptable at the ingress of each QOS domain.

11. The method according to claim 3, wherein said QER is determined through judging whether the QOS domain of the interface at previous hop or next hop is identical.

12. The method according to claim 3, further comprising the processing procedures for preemption of resources allocated to an aggregate flow with low priority by an aggregate flow with high priority, wherein when an aggregate flow with high priority creates a resource request but the pre-allocated resources are not enough, unused resources allocated to an aggregate flow with low priority are preempted, and the resource pre-allocation to the aggregate flow with high priority is performed.

13. The method according to claim 3, further comprising the processing procedures through which the resources allocated to the aggregate flow is released, wherein when the accumulative total of the resources to be released is determined to have reached to the predefined quantity of the resources, the resources allocated to the aggregate flow are released.

14. The method according to claim 3, wherein different QOS domains may use different intra-domain resource allocation methods in them; said resource allocation methods comprising a signaling-based resource allocation method and a policy server-based resource allocation method.

15. The method according to claim 3, further comprising:
sending path detection messages to the destination terminal with the source terminal;
storing the edge router list with a QER or policy server connected with the destination terminal;
detecting whether the data flow path has changed; and
establishing a new resource allocation and canceling the old resource allocation if the data flow path has changed; otherwise taking no processing.

16. The method according to claim 3, further comprising:
when the aggregate flow path in a QOS domain is different from the data flows path passing through the QOS domain, or when there are a plurality of equivalent paths in the QOS domain,
establishing a tunnel between the edge router at ingress of the QOS domain and the edge router at egress of the QOS domain; and
forcing the data flows forward through the established tunnel during data flow transmission.

17. The method according to claim 3, further comprising a process of statistical adjustment of pre-allocated resources, which comprises: adjusting the pre-allocated resources according to the mean rate and time delay parameters of the aggregate flow periodically.

18. The method according to claim 2, further comprising:
a11. initiating a resource request for data flows to the policy server of an adjacent QOS domain;
b11. determining the aggregate flow ID for the data flows, calculating the path in a current QOS domain for the data flows and a next QOS domain, and forwarding the resource request to the policy server of the next QOS domain at the policy server;
c11. processing in the same way at the policy server of each QOS domain, and forwarding the request message for the data flows to the destination terminal from the policy server of a QOS domain connected with the destination terminal;
d11. determining the resources that can be allocated to the data flow and returning a resource allocation message to the policy server at the destination terminal;
e11. allocating resources for the aggregate flow at the nodes along the path through the current QOS domain and forwarding the resource allocation message for the data flows to the policy server of a previous QOS domain in the data flow transmitting direction with the policy server;
f11. receiving said resource allocation message and allocating resources with the source terminal.

19. The method according to claim 18, wherein said policy server determines the resource allocation solution according to the topology information and resource occupation condition in a QOS domain where said policy server is located.

* * * * *